REFLECTANCE COLORIMETER WITH HYBRID TYPE STABILIZED AMPLIFIER

Filed Feb. 14, 1966

INVENTOR.
PATRICK M.L.SIMMONS

BY

Allen and Chromy

ATTORNEYS

INVENTOR.
PATRICK M. L. SIMMONS
BY Allen and Chromy
ATTORNEYS

REFLECTANCE COLORIMETER WITH HYBRID TYPE STABILIZED AMPLIFIER

Filed Feb. 14, 1966

INVENTOR.
PATRICK M. L. SIMMONS
BY
ATTORNEYS

United States Patent Office 3,437,819
Patented Apr. 8, 1969

3,437,819

REFLECTANCE COLORIMETER WITH HYBRID TYPE STABILIZED AMPLIFIER

Patrick M. L. Simmons, San Jose, Calif., assignor of one-half to Genevieve I. Hanscom, Saratoga, Calif., and one-half to Genevieve I. Hanscom and Lois J. Duggan, as trustees of the estate of Roy M. Magnuson Filed Feb. 14, 1966, Ser. No. 527,243
Int. Cl. H01j 39/12
U.S. Cl. 250—214 7 Claims This invention relates to a direct reading reflectance colorimeter constructed to measure the relative spectral qualities of product samples.

An object of this invention is to provide an improved direct reading reflectance colorimeter.

Another object of this invention is to provide an improved reflectance colorimeter employing several interference type filters, each having a band width of approximately 10 millimicrons, said filters being constructed so that they are capable of selectively selecting certain persistent lines generated by neon and mercury light sources.

Still another object of this invention is to provide an improved reflectance colorimeter employing a hybrid type amplifier with vacuum tubes and transistors and associated parts constructed to have high temperature stability.

Still another object of this invention is to provide an improved reflectance colorimeter with an amplifier that produces an output current that is a linear function of the exciting radiant illumination.

Still another object of this invention is to provide an improved amplifier for a reflectance colorimeter, said amplifier constructed to amplify an AC signal supplied thereto by a light-sensitive cell that is illuminated by light reflected from the product being color graded, which AC signal is rectified and the rectified signal voltage integrated to provide an average DC signal to a meter bridge network employing transistors in two legs thereof, which transistors are mounted with the collectors thereof in physical contact whereby the effect of temperature drifts of the transistors are offset and the effect thereof on the meter reading is substantially eliminated.

Other and further objects of this invention will be apparent to those skilled in the art to which it relates from the following specification, claims and drawing, in which, briefly:

Figure 5:
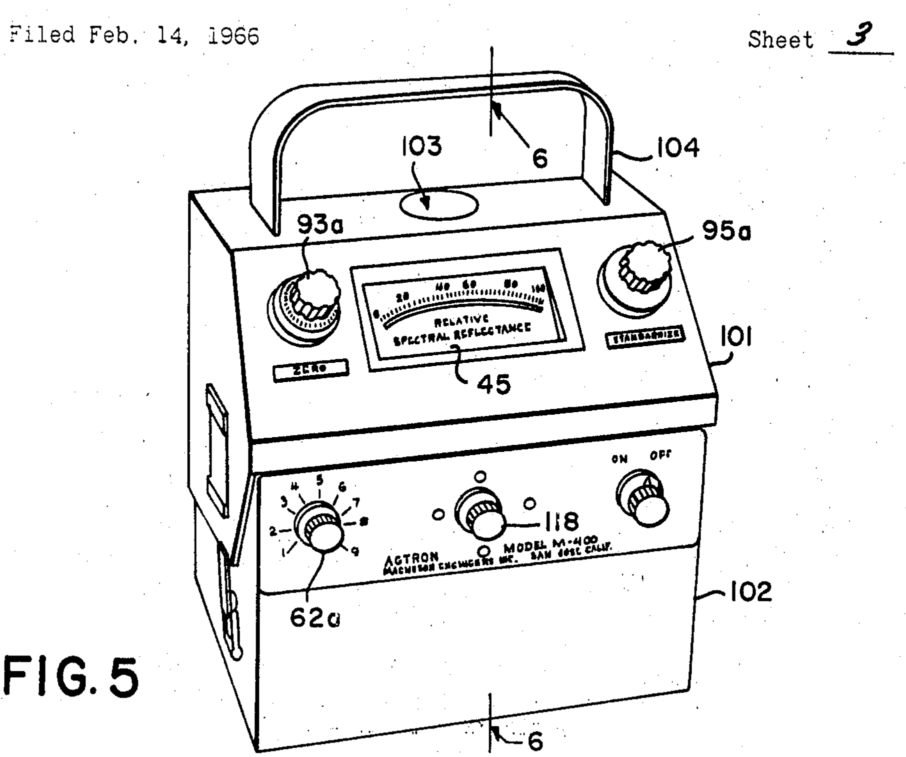
FIG. 5 is a front view of an embodiment of this apparatus.

Referring to the drawing in detail, reference numeral 10 designates the electric discharge tubes providing the light source employed in this reflectance colorimeter, and these tubes are supported in the colorimeter housing, as shown in FIG. 5. This light source employs two electric discharge tubes 11 and 12, one of which is provided with an atmosphere of neon gas and the other of which is a mercury vapor discharge lamp. The electric discharge devices 11 and 12 are connected in series and they are connected to the output of the high voltage transformer 13 which supplies the energizing current thereto. The primary of the high voltage transformer 13 is connected to the output of the voltage regulator 14 which is connected to a conventional 120 v. lighting current supply circuit. The connections between the light source and the transformer 13 and regulator 14 may be the same as shown in application Ser. No. 260,115, filed Feb. 21, 1963 by Richard B. Nelson for Color Grading Apparatus and Method and assigned to a common assignee.

Figures 3, 4:
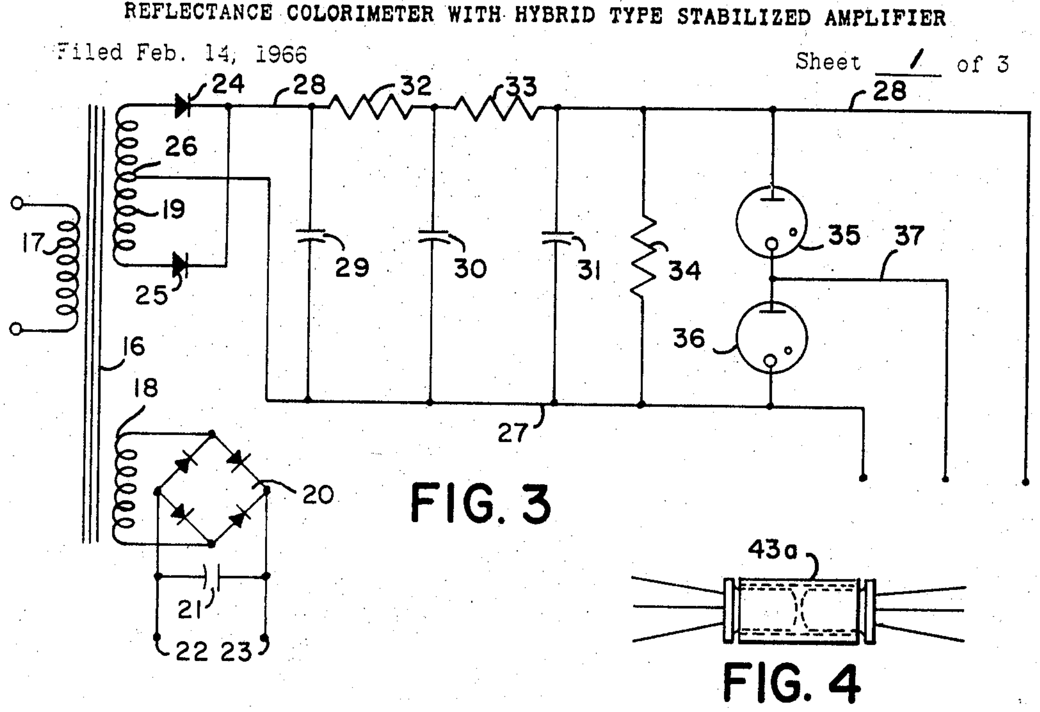
FIG. 3 is a schematic wiring diagram of the power supply employed for the colorimeter amplifier.
FIG. 4 is a detail view showing the mounting of the transistors employed in the meter bridge circuit.

The power supply 15 for the amplifier and light-sensitive cell is shown in detail in the schematic wiring diagram FIG. 3. This power supply is provided with a transformer 16 having a primary 17 that is connected to the output of the voltage regulator 14 so that the transformer is energized by 120 v. A.C. supply. The transformer 16 is also provided with secondary windings 18 and 19. The secondary winding 18 is a low voltage winding and the output thereof is connected to the bridge rectifier 20. The output of rectifier 20 is connected across a large filter condenser 21 and to terminals 22 and 23 which are connected to the cathode heaters of the vacuum tube amplifiers, as will be described hereinafter.

The outer terminals of the secondary winding 19 are connected to the respective anodes of diode rectifiers 24 and 25 and the cathodes of these diodes are connected together to line 28. The center tap 26 of winding 19 is connected to the ground line 27 which forms the negative supply line of the power supply. Filter capacitors 29, 30 and 31 are connected between lines 27 and 28 and resistors 32 and 33 are connected in series in line 28 and between upper terminals of selected capacitors 29, 30 and 31, as shown in the wiring diagram. Resistor 34 is connected between lines 27 and 28 and voltage regulator tubes 35 and 36 are connected in series also between these lines which form the 215 volt output of the power supply. Line 37, which is connected to the common connection between regulator tubes 35 and 36, forms the 105 volt line that is connected to the anode of the light-sensitive cell 39, the cathode of which is connected to the input of amplifier 38 through the shielded cable 40, as shown in FIGS. 1 and 2.

The amplifier of this apparatus is provided with two amplifier tubes, namely, the pentode 41 and dual triode 42, and transistors 43 and 44 which are connected in two of the legs of the bridge circuit which includes the indicating meter 45. The light-sensitive cell 39 is connected to the input of the amplifier by the shielded cable 40 which extends from the cathode of the light-sensitive cell 39 to the upper terminal of resistor 46 and to the control grid 47 of the pentode 41. The cathode 48 is connected to the upper terminals of the resistor 52 and capacitor 53. The suppressor grid 50 of the pentode is also connected to the cathode 48. The screen grid 49 of the pentode is connected to the upper terminal of capacitor 54 and lower terminal of resistor 56.

The lower terminal of resistor 55 is connected to the anode 51 of the pentode 41 and to the upper terminal of capacitor 57. The lower terminal of capacitor 57 is connected to the control grid of the first triode section of tube 42, and also to the upper terminal of resistor 58. The lower terminal of resistor 69 is connected to the anode 65 of tube 42 and to the upper terminal of capacitor 60. The lower terminal of capacitor 60 is connected to the upper terminal of the potentiometer 61 which is provided with a variable contact 62 that is connected to the control grid 66 of the second triode section of tube 42. Potentiometer 61 functions as the gain control of the amplifier and it is provided with a control knob 62*a* shown in FIG. 5.

Figure 1:
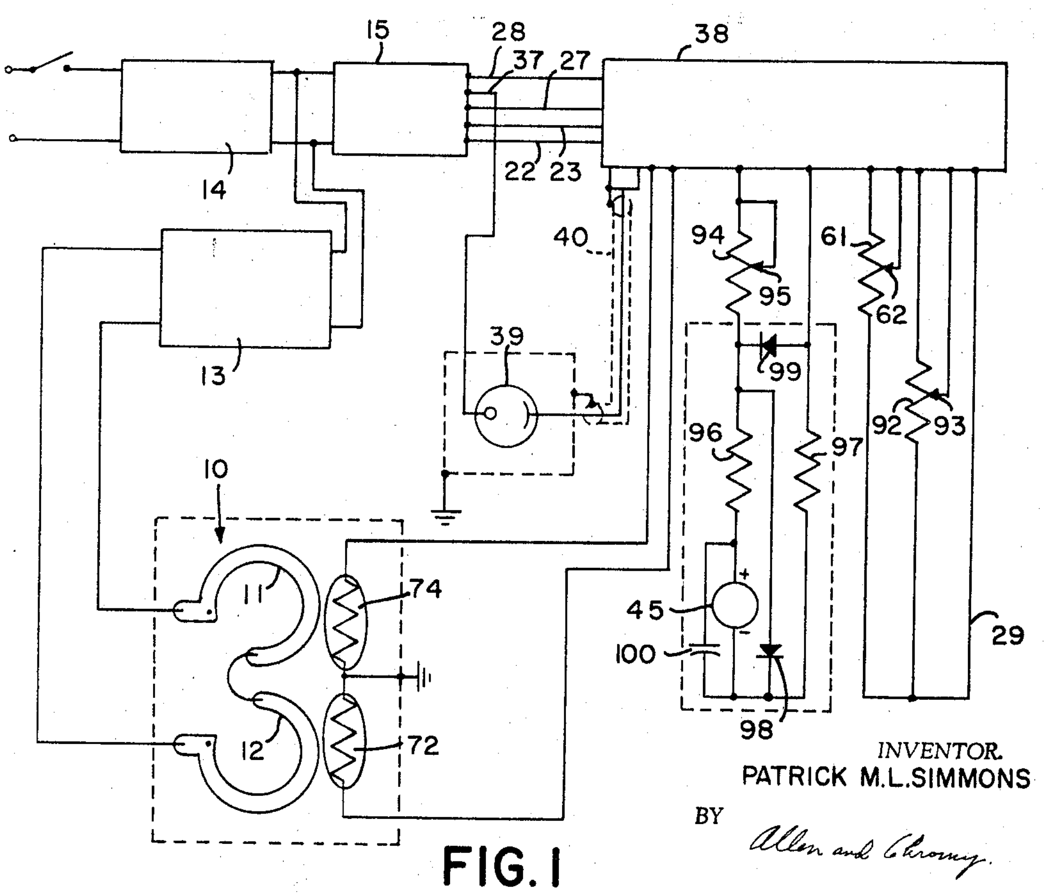
FIG. 1 is a schematic wiring diagram of the electrical connections employed in this reflectance colorimeter.
Figure 2:
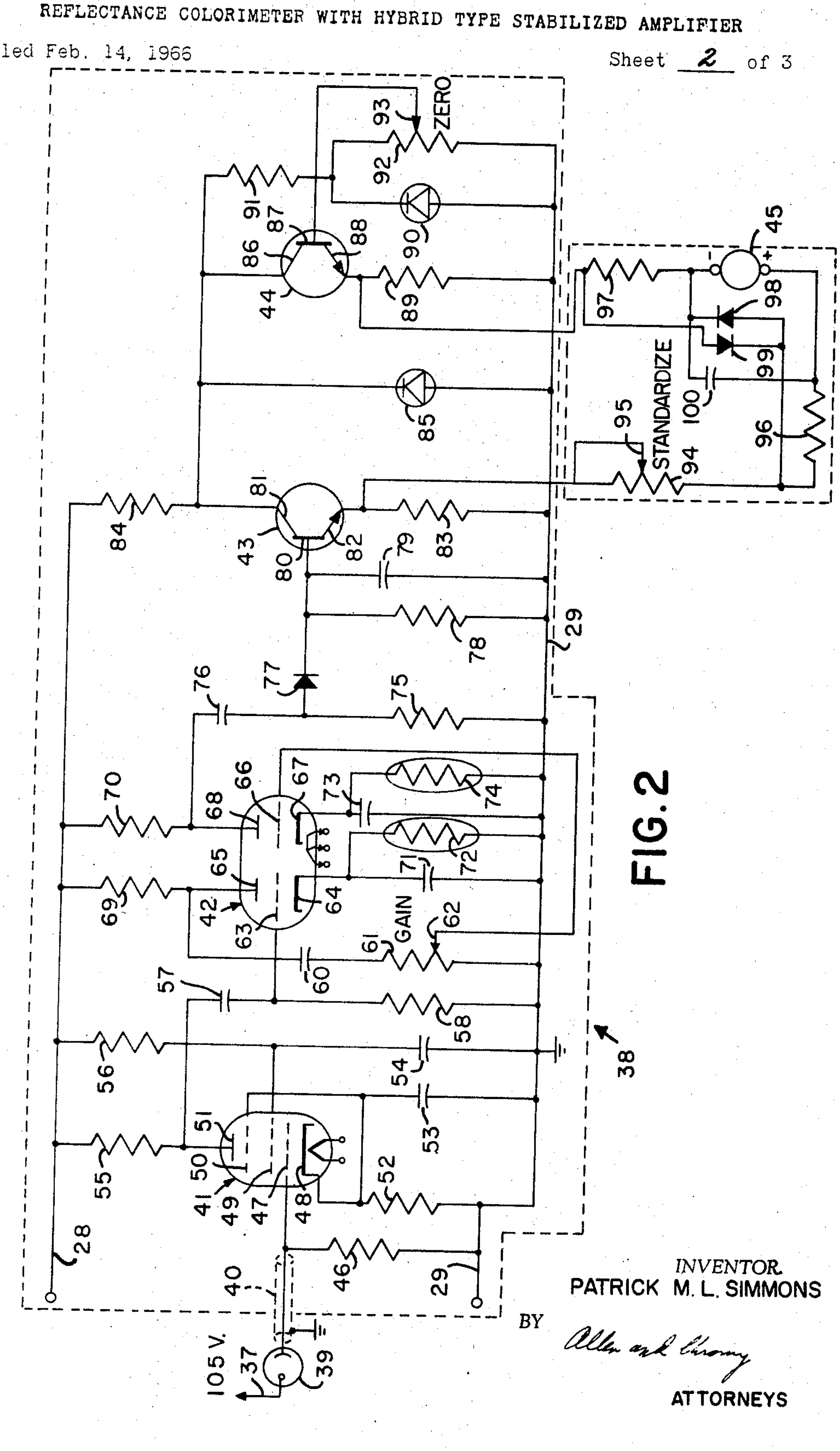
FIG. 2 is a schematic wiring diagram of the amplifier employed in this reflectance colorimeter.

The temperature-sensitive resistors 72 and 74 which are positioned adjacent to the light sources 11 and 12, as shown in FIG. 1, are connected to the cathodes 64 and 67 of the dual triode tube 42, and capacitors 71 and 73 are connected across these resistors 72 and 74, respectively. These cathode resistors 72 and 74 are negative temperature coefficient devices which automatically control the gain of the amplifier throughout broad ambient temperature variations, as disclosed in the aforesaid Nelson application, Ser. No. 260,115.

The lower terminal of resistor 70 is connected to the anode 68 of the second triode section of tube 42 and also to the upper terminal of capacitor 76. The lower terminal of capacitor 76 is connected to the anode of the diode 77 and also to the upper terminal of resistor 75. The cathode of diode 77 is connected to the base 80 of transistor 43 and to the upper terminal of resistor 78, and also to the upper terminal of the integrating capacitor 79. Capacitor 79 integrates the saw tooth wave form output from diode 77 and produces a stable substantially non-fluctuating direct current voltage level at the base 80 of transistor 43. The collectors 81 and 86 of transistors 43 and 44, respectively, are connected together to the cathode of diode 85 and to the lower terminal of resistor 85. Transistors 43 and 44 are mounted in a copper tube 43*a*, as shown in FIG. 4, with the collectors 81 and 86 making physical contact to provide an offsetting effect of the temperature drift of each transistor.

Resistors 84, 91 and potentiometer 92 are connected in series between the positive supply line 38 and the ground or negative line 29. The variable contact 93 of the potentiometer 92 is connected to the base 87 of transistor 44. Potentiometer 92 is referred to hereinafter as the zero control and it is provided with a knob 93*a*, as shown in FIG. 5, which is used to control the variable contact 93.

The upper terminals of resistors 55, 56, 69, 70 and 84 are connected to the positive current supply line 28. The lower terminals of resistors 46, 52, 58, 72, 74, 75, 78, 83, 84 and 89 and potentiometers 61 and 92 are all connected to the negative or ground line 29. In addition, the bottom terminals of capacitors 53, 54, 71 and 79 and anodes of diodes 85 and 90 are also connected to this ground line 29. Diode 85 functions as a voltage regulator for the collectors 81 and 86 of transistors 43 and 44, respectively. Diode 90 functions as a voltage regulator across the zero potentiometer 92.

The emitter 82 of transistor 43 is connected to the upper terminal of resistor 83 and also to the upper terminal of potentiometer 94 and to the variable contact of this potentiometer, which will be referred to hereinafter as the standardized potentiometer. The emitter 88 of transistor 44 is connected to the upper terminal of resistor 89 and also to the upper terminal of resistor 97 which is also connected to the anode of diode 99. The lower terminal of resistor 97 is connected to the negative terminal of indicating meter 45 and to the cathode of diode 98 and also to the upper terminal of capacitor 100. The cathode of diode 99 and the anode of diode 98 are connected together and to the lower terminal of standardized potentiometer 94, and also to the left hand terminal of resistor 96. The right hand terminal of resistor 96 is connected to the lower terminal of capacitor 100 and to the positive terminal of indicating meter 45. Diodes 98 and 99 are used in conjunction with resistors 96 and 97 for overvoltage protection for meter 45.

Figure 6:
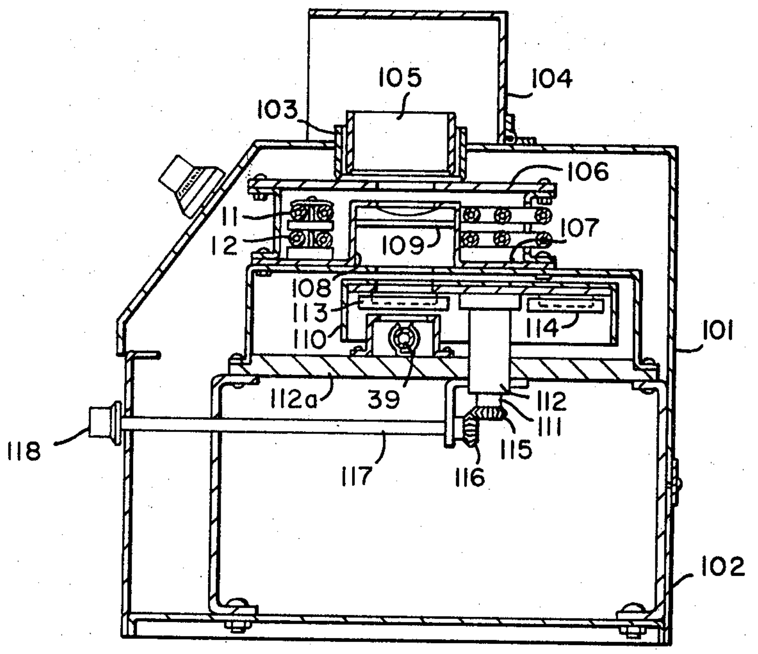
FIG. 6 is a vertical sectional view taken along the line 6—6 of FIG. 5.

In FIGS. 5 and 6 there is illustrated an embodiment of this apparatus housed in a cabinet structure employing the top section 101 which is hinged to the bottom section 102. The top cabinet structure section 101 is provided with a sample receiving well 103 which is adapted to be covered by the hood 104 to screen extraneous light therefrom. The sample receiving receptacle 105 is adapted to be positioned in this well so that it is supported by the plate 106 positioned inside of the cabinet. This receptacle is provided with a transparent bottom so that a sample positioned in the receptacle may be illuminated from the bottom. The tubular light sources 11 and 12 are supported on the plate member 107 so that they surround the tubular member 108 which is aligned with the bottom of the sample receptacle 105, and also with the light-sensitive cell 39 which is supported on the plate member 112*a*.

An infrared filter 109 is supported in the tubular member 108. The filter turret 110, which is supported by the shaft 111, is provided with four narrow band filters supported thereon in alignment with apertures therein. The filter assembly includes blue, green and red filters for selecting the 436 millimicron line, the 546 millimicron line and the 640 millimicron line, respectively. A fourth filter may be provided to the filter assembly if desired. These filters are adapted to be selectively positioned in the light path between the bottom of the sample receptacle 105 and the light-sensitive cell 39, by the manual control knob 118 which is attached to the shaft 117. The shaft 117 is coupled to the shaft 111, which is journaled in the sleeve 112, by bevel gears 115 and 116, as shown, so that the turret may be rotated by turning knob 118.

The operation of this apparatus is as follows. This device will provide a reading of the spectral reflectance in any or all of the three color modes of various products. However, in practice, it is usually desired to know the reflectance of only one or two spectral lines in measuring the reflectance of a product. For example, in checking tomato juice in the red mode, a high reading indicates a high degree of redness, while a low green reading indicates the absence of green content. Products which are light red, green and yellowish are usually investigated for green reflectance. Red, brown and beige products are usually investigated for redness. Light products such as paper, flour, powders and dairy products normally give the most meaningful results in the blue mode. The blue mode is ideal for detecting the yellowness of paper or starch. Generally, the color mode nearest the color of the product is the most effective and is selected for reflectance measurements. Thus, the operator of this apparatus manipulates the control 118 to shift the desired color filter into the light path between the light-sensitive cell 39 and the bottom of the specimen in receptacle 105 so that light from the light sources 11 and 12 reflected from the bottom of the specimen in this receptacle is transmitted to the light-sensitive cell through the appropriate selected filter.

Prior to placing the specimen sample in the receptacle 105, this device must of course be calibrated before it is ready for use, and in the calibration thereof the operator employs selected light reflecting discs which are placed in the well 103 of the device. These discs are made of a suitable plastic impregnated with permanent pigment material so that the discs form a range from white to dark or black and suitable steps of gray therebetween. To adjust the instrument, the operator performs the following steps:

(1) The lightest reflecting disc is placed in the well 103 and the zero control 93*a*, standardized control 95*a* and gain control 62*a* are set, for example, on 10, zero and 1, respectively.

(2) The gain control 62*a* is then slowly increased to obtain a reading of 100 on the meter 45.

(3) The light disc is then removed from the well 103 and the dark disc is placed therein. The zero control 93*a* is then adjusted to obtain a reading of zero on the meter 45.

(4) This dark disc is then removed from the well and the light disc previously used in the well is replaced. Thereafter, the gain control 62*a* and standardized control 95*a* are increased to obtain a reading of 100 on the meter 45.

(5) The procedure of step (3) is then repeated and thereafter the light disc is again placed into the sample well 103 and control 95*a* adjusted to obtain a reading of 100 on the meter 45.

Generally, low settings of gain control 62*a* and low settings of standardized control 95*a* are used for a large calibration spread, that is, when the black disc is used for obtaining the zero setting of meter 45 and a white disc is used for adjusting the standardized control. High settings of gain control 62*a* and standardized control 95*a* are used when there is little difference between the shades of the calibration discs. Thus, these settings are useful when the differences in the color shades of the product being tested is small. In such cases, when adjusting the zero setting of the indicating meter 45, the calibration disc employed for this purpose need not be the dark disc but should be a disc slightly darker than the product to be tested.

While I have shown a preferred embodiment of the invention, it will be understood that the invention is capable of variation and modification from the form shown so that its scope should be limited only by the scope of the claims appended hereto.

What I claim is:

1. In a direct reading reflectance colorimeter, the combination of a light-sensitive cell, means illuminating a specimen to be color graded, means supporting said light-sensitive cell so that it receives light reflected from said illuminated specimen, an amplifier having the input circuit thereof connected to said light-sensitive cell, said amplifier having an output circuit comprising a bridge circuit and an indicating instrument connected to said bridge circuit, a source of current supply connected to said amplifier, a pair of transistors connected to two legs of said bridge circuit, one of said transistors forming the output stage of said amplifier, and means equalizing the operating temperatures of said transistors to prevent unequal temperatures thereof from effecting the operation of said bridge.

2. In a direct reading reflectance colorimeter, the combination as set forth in claim 1 further characterized in that said illuminating means comprises electric discharge device means, said discharge device means producing substantially monochromatic persistent red, green and blue lines in the light spectrum illuminating said specimen, narrow band filter means selecting said lines reflected from said specimen, said filter means being interposed between said specimen and said light-sensitive cell to control illumination of said cell.

3. In a direct reading reflectance colorimeter, the combination as set forth in claim 2 further characterized in that the light generated by said electric discharge device means is in the form of pulses and said light-sensitive cell produces current pulses which are amplified by said amplifier, said amplifier having a device integrating the current pulses, means connecting said integrating device to supply a stable direct current signal to said output transistor.

4. In a direct reading reflectance colorimeter, the combination as set forth in claim 3, further characterized in that said connecting means connects said integrating device to the base of said output transistor, means connecting the collectors of said transistors together and to said source of current supply and means connecting said indicating instrument between the emitters of said transistors.

5. In a direct reading reflectance colorimeter, the combination as set forth in claim 1 further comprising adjustable voltage divider means connected to said source of current supply and to the base of the other of said transistors to provide a zero adjusting means for said bridge circuit.

6. In a direct reading reflectance colorimeter, the combination as set forth in claim 5 further characterized in that said adjustable voltage divider means comprises a potentiometer having a variable contact connected to the base of said other transistor, and a diode connected across said potentiometer to regulate the voltage across it.

7. In a direct reading reflectance colorimeter, the combination as set forth in claim 4 further characterized in that the means connecting said indicating instrument comprises overvoltage protecting diodes connected to said indicating instrument.

References Cited

UNITED STATES PATENTS 3,016,788 1/1962 Smith ---------------- 88—14

RALPH G. NILSON, *Primary Examiner.*

M. A. LEAVITT, *Assistant Examiner.*

U.S. Cl. X.R.

88—14